United States Patent
Farwig

(10) Patent No.: US 7,597,441 B1
(45) Date of Patent: Oct. 6, 2009

(54) POLARIZED CONTRAST ENHANCING SUNGLASS LENS

(76) Inventor: Michael J. Farwig, 25716 Barnett La., Stevenson Ranch, CA (US) 91381

( * ) Notice: Subject to any disclaimer, the term of this patent is extended or adjusted under 35 U.S.C. 154(b) by 0 days.

(21) Appl. No.: 12/079,370

(22) Filed: Mar. 26, 2008

Related U.S. Application Data

(63) Continuation-in-part of application No. 11/973,421, filed on Oct. 9, 2007, now abandoned.

(51) Int. Cl.
*G02C 7/10* (2006.01)

(52) U.S. Cl. .................. 351/163; 351/44; 351/165; 351/166

(58) Field of Classification Search .......... 351/163
See application file for complete search history.

(56) References Cited

U.S. PATENT DOCUMENTS

| | | | |
|---|---|---|---|
| 5,039,631 A * | 8/1991 | Krashkevich et al. | 501/64 |
| 5,190,896 A * | 3/1993 | Pucilowski et al. | 501/64 |
| 5,729,323 A | 3/1998 | Arden et al. | |
| 6,145,984 A | 11/2000 | Farwig | |
| 6,334,680 B1 | 1/2002 | Larson | |
| 6,450,652 B1 | 9/2002 | Karpen | |
| 6,604,824 B2 | 8/2003 | Larson | |
| 6,652,972 B1 * | 11/2003 | Conzone et al. | 428/426 |
| 6,773,816 B2 | 8/2004 | Tsutsumi | |
| 7,036,932 B2 | 5/2006 | Boulineau et al. | |
| 2005/0264161 A1 * | 12/2005 | Oaku et al. | 313/486 |
| 2009/0069164 A1 * | 3/2009 | Lamberson et al. | 501/15 |
| 2009/0166584 A1 * | 7/2009 | Shimooka et al. | 252/301.4 F |

* cited by examiner

*Primary Examiner*—Jessica T Stultz
(74) *Attorney, Agent, or Firm*—Martin Fruitman

(57) ABSTRACT

The invention is a polarized sunglass lens that utilizes a multi-band contrast enhancer comprised of three rare-earth oxides to provide relatively high peak transmittance in portions of the red and green spectrum, relatively lower transmittance for the blue spectrum, and very low transmittance for the UV spectrum. The lens provides enhanced perception of colors, heightened contrast, and improved visual acuity. The inclusion of vanadium pentoxide in the lens provides attenuation of the UV spectrum, thus protecting the user's eyes and the internal layers and colorants from UV-induced damage. The front lens element can be either the multiband contrast enhancer or a photochromic lens element.

17 Claims, 5 Drawing Sheets

——— Light filter of the present invention

--------- Prior-art light filter comprising neodymium oxide according to US Patents 6,334,680 and 6,604,824 issued to Larson

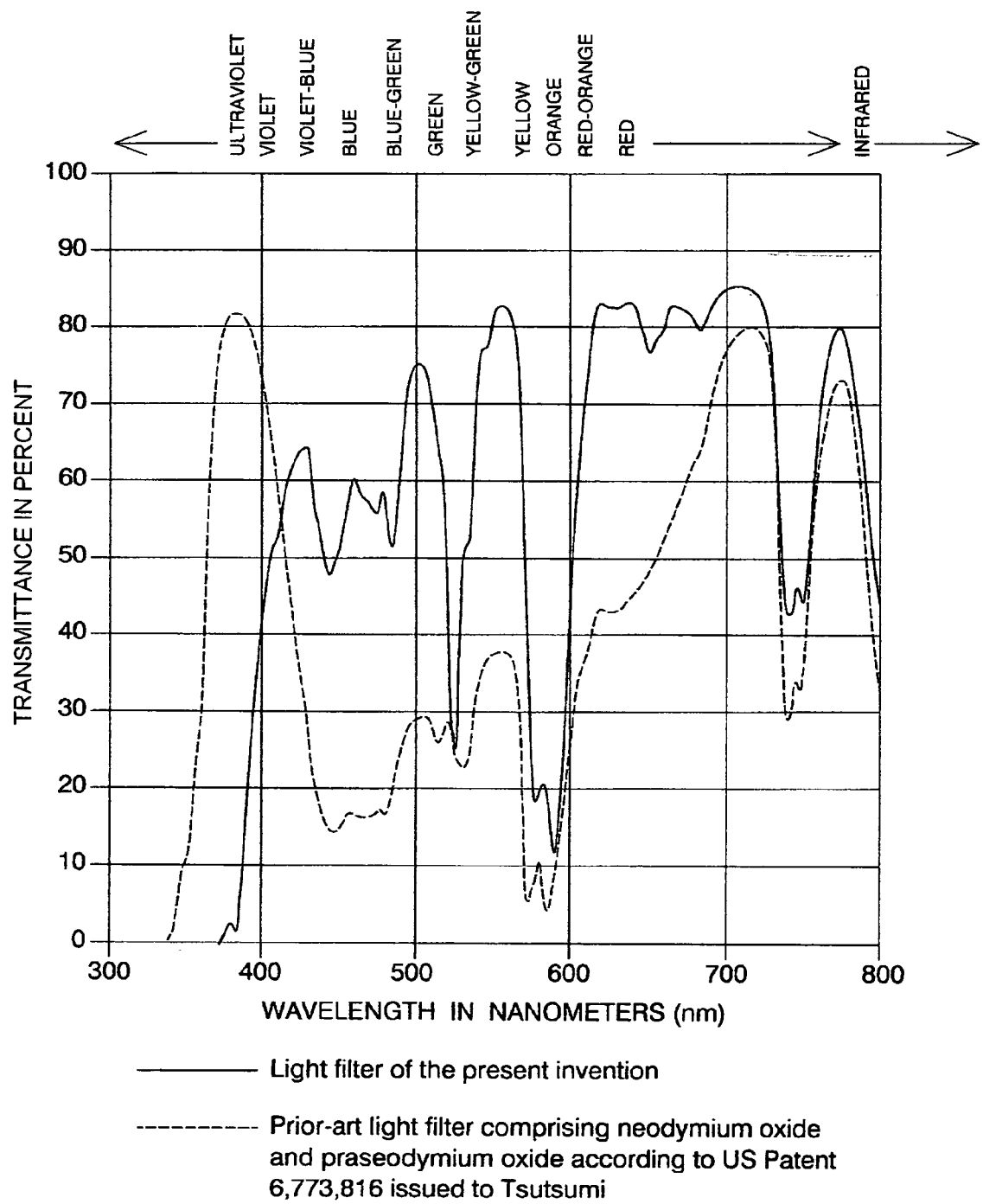

POLARIZED CONTRAST ENHANCING SUNGLASS LENS

This application is a continuation-in-part of the prior U.S. application for POLARIZED CONTRAST ENHANCING SUNGLASS LENS, Ser. No. 11/973,421, filed on Oct. 9, 2007, now abandoned for which the sole applicant was the same applicant as for this application.

BACKGROUND OF THE INVENTION

The present invention relates to polarized sunglass lenses with particular vision-enhancing properties.

Recent advances in sunglass lens technology, such as polarized lenses incorporating certain rare-earth compounds, have brought long-desired improvements in perceived color saturation, contrast, and visual acuity. In particular, lenses made in conformance with U.S. Pat. No. 6,145,984 by Farwig demonstrate the advantages of combining light polarization with selective color filtration through the use of a glass composition comprising three particular rare-earth oxides to achieve a remarkable degree of vision enhancement.

Rare-earth oxides are oxides of metals in the lanthanide and actinide series of the periodic table of elements. When incorporated into optical-glass compositions, some of these rare-earth metal oxides impart selective filtering of certain portions of the visible light spectrum.

The Farwig patent discloses points of maximum light transmittance that are located within the blue, green, and red portions of the visible light spectrum (the three additive primary colors upon which human color vision is based) and points of minimum light transmittance located between the points of maximum light transmittance. This type of lens is called "trichroic" because it thus favors the transmittance of the three primary additive colors.

The Farwig patent discloses three examples of trichroic rare-earth glass, each of which could be combined with a polarizer to implement the Farwig lenses. The first of these is Schott S-8807, a neodymium-oxide glass known in the optical industry as Amethyst Contrast Enhancement or "ACE" glass. The second of these is Schott S-8801, which is known as didymium glass. Didymium glass contains oxides of neodymium and praseodymium. The third of these is Schott S-8506, a glass which contains oxides of neodymium, praseodymium, and erbium. None of these glass types effectively block ultraviolet (UV) light at 1 mm thickness and all have very high light transmittance in the near-UV range of 380 nm to 420 nm.

In lenses made according to U.S. Pat. No. 6,604,824 or 6,334,680 by Larson only one rare-earth oxide is employed, namely neodymium oxide. Lenses which use Schott S-8506 glass according to the Farwig patent have a more complex spectral transmittance profile than the Larson lenses due to the two additional rare-earth oxides present in Schott S-8506. The Larson lenses have some similar peak transmittance and absorption bands, but with less pronounced absorption bands. No disclosed formulations of the Larson neodymium glass block UV light to a significant extent. Blocking of UV light in the Larson lenses as disclosed requires the addition of UV-blocking means to at least one layers of the lens structure other than the layer which contains the neodymium oxide.

In polarized lens assemblies of the prior art which incorporate these rare-earth light filters and contrast enhancers as lens elements, dyes or other colorants are typically formulated into the adhesive, polarizer, and/or rear lens element layers to block UV light and near-UV light, to reduce the transmittance of visible light to the desired low levels in the finished laminated lens assemblies, and/or to provide a color tint.

The importance of avoiding excess ocular exposure to UV and near-UV light is well-known in the ophthalmic industry, as these wavelengths have been linked to the development of cataracts and macular degeneration, both of which cause vision loss. It can also be appreciated that the blocking of UV light before it strikes the internal layers of a laminated lens assembly is beneficial in preventing fading and discoloration of UV-sensitive color dyes and UV-blocking agents that may be present in the polarizer film or adhesive layers.

Those prior-art polarized sunglass lenses which relied upon UV-absorbing dyes added to the polarizer film and/or adhesive layers are subject to a loss of UV protection if these dyes degrade when subjected to frequent and prolonged exposure to high-intensity direct sunlight, as sunlight contains a substantial amount of harmful UV light. UV-induced damage to polarizer dyes can also cause some prior-art polarized lenses to exhibit visible tint discoloration or fading under similar conditions. This is certainly not a desirable trait in sunglass lenses.

U.S. Pat. No. 6,773,816 by Tsutsumi is also of some relevance. Some embodiments of the Tsutsumi didymium glass filter as disclosed are able to block UV light and near-UV light in the range of 380 nm to 400 nm. However, the disclosed examples exhibit such low transmittance of certain blue, green, and/or red wavelengths as to interfere with accurate color perception.

It would be very beneficial for a polarized sunglass lens to provide enhanced perception of all visible colors while blocking dangerous UV and near-UV light and providing substantial, permanent, non-fading absorption of destructive UV light in the front lens element to protect the polarizer film and adhesive layers from UV-induced discoloration, fading, or other degradation.

SUMMARY OF THE INVENTION

The present invention is a contrast-enhancing polarized sunglass lens that protects the user's eyes from UV light and also protects the polarizer and adhesive layers within the lens from UV-induced discoloration, fading, or other degradation. The present invention also provides increased color saturation, contrast, and visual acuity; and being a polarized lens, it provides substantial reduction of the glare reflected by various terrestrial surfaces.

The elimination of UV-induced fading and discoloration of the polarizer film and adhesive layers is accomplished in the preferred embodiment by blocking wavelengths below 380 nm, in the front lens element. Vanadium pentoxide is formulated into the multiband contrast enhancer for this purpose. Being a metal oxide, vanadium pentoxide is impervious to UV-induced fading, and it is useful in attenuating the transmittance of visible violet and violet-blue wavelengths. Blocking of wavelengths from 380 to 400 nm, which are potentially harmful to the human eye, but which are much less destructive to internal layers of a polarized sunglass lens and to any UV-sensitive colorants in these layers, is provided by UV-absorbing agents known in the sunglass industry as "UV400-rated" added to these internal layers and/or to the rear lens element. The UV-400 absorbing agents, if added to internal layers, are in turn protected by the permanent, non-fading UV-absorption property of the front lens element of the present invention.

Unlike prior contrast-enhancer means containing neodymium oxide, the multiband contrast enhancer in the preferred embodiment of the present invention produces maximum transmittance values for wavelengths from 420 nm to 460 nm that are approximately equal to the luminous transmittance value of the multiband contrast enhancer, which is approximately 60 percent of the total visible light to which the multiband contrast enhancer is subjected. Additionally, unlike prior lenses containing neodymium oxide or didymium, the multiband contrast enhancer of the present invention steeply attenuates all wavelengths below 420 nm without severely attenuating the majority of the visible blue spectrum. This is essential if a grey lens is desired and it promotes accurate color perception.

The multiband contrast enhancer of the present invention provides relatively high light transmittance in the red and green portions of the spectrum, while the trichroic contrast enhancer as defined in U.S. Pat. No. 6,145,984 provides relatively high light transmittance in the red, green, and blue portions of the spectrum. Using the multiband contrast enhancer of the present invention avoids excessive violet and violet-blue (near-UV) transmittance values and still provides enhanced perception of blue colors due to the deep attenuation of amber wavelengths, the complement of blue, in the range of 570 nm to 590 nm. Attenuating amber wavelengths makes blue appear more saturated without requiring excessively high transmittance of blue wavelengths and it increases the perceived chromatic contrast between red and green.

The present invention therefore enhances human vision by increasing color saturation and contrast while protecting the user's eyes from UV exposure and protecting the internal polarizer, adhesive layers, UV-blocking agents, and colorants within the lens from damage caused by prolonged exposure to sunlight.

BRIEF DESCRIPTION OF THE DRAWINGS

FIG. 2B is a graph comparing the spectral-transmittance properties of the multiband contrast enhancer of the present invention to the spectral-transmittance properties of a first light filter comprising neodymium oxide and praseodymium oxide as disclosed in U.S. Pat. No. 6,773,816 issued to Tsutsumi.

DETAILED DESCRIPTION OF THE INVENTION

Figure 1:
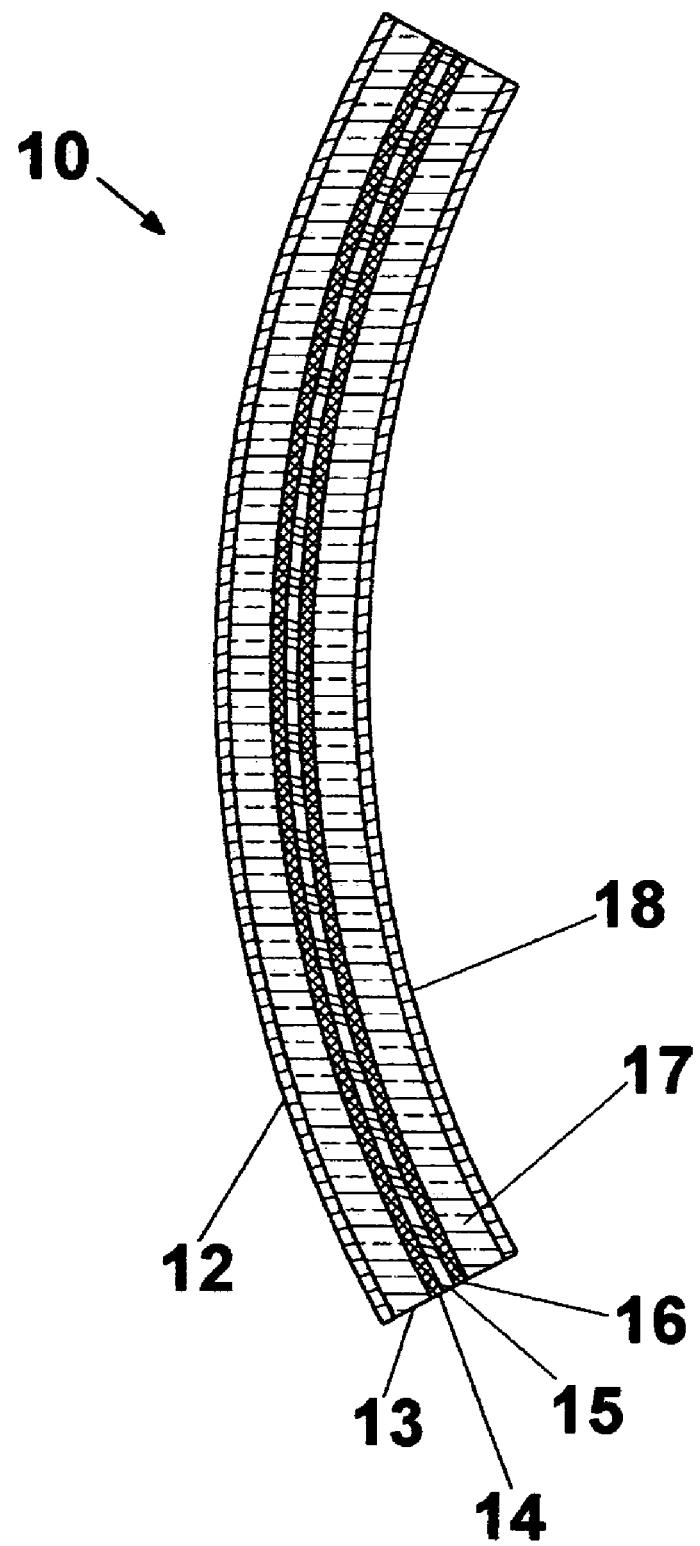
FIG. 1 is a cross-section view of the preferred embodiment of the invention, which is a laminated multilayer lens comprising a multiband contrast enhancer and a light polarizer.

FIG. 1 is a cross section view of laminated lens assembly 10 of the preferred embodiment of the invention, depicting polarizing film 15 disposed between two lens elements 13 and 17, with the lamination secured by adhesive layers 14 and 16. Laminated lens assembly 10 also has coatings 12 and 18 applied to the exterior surfaces of lens elements 13 and 17. The methods of manufacturing laminated polarized sunglass lens assemblies are well-known in the sunglass industry and need not be repeated in detail here.

The specific phrase "luminous transmittance" as used herein refers to the mean light transmittance of an optical lens or filter over a range of visible wavelengths of light as measured and defined within ANSI specification Z80.3-2001. The specific phrase "light transmittance" as used herein refers to transmittance for a single wavelength of light. The term "photochromic" as used herein means the ability to darken when exposed to sunlight. With regard to lens surfaces, the "front surface" means the convex surface of the lens and the "back surface" means the concave surface of the lens.

Specification ANSI Z80.3-2001 Sections 4.6.3.2 and 4.6.3.3 impose certain restrictions with regard to the light-transmittance properties of sunglass lenses intended for driving and road use. This includes requirements for traffic-signal recognition and uniformity of spectral transmittance. These requirements are met in lenses of the present invention by properly formulating the amounts of the rare-earth oxides and other colorants in order to yield the desired result.

The preferred embodiment of the present invention is laminated lens assembly 10 constructed with two thin lens elements 13 and 17 (often called "wafers" or "caps" in the ophthalmic industry) laminated together with polarizing film 15 precisely formed to match the curvature of and sandwiched between the two lens elements, one of the lens elements comprising a multiband contrast enhancer as disclosed herein.

In the preferred embodiment of a non-photochromic embodiment of the present invention, front lens element 13 is the multiband contrast enhancer, rear lens element 17 is clear glass or plastic, and the lamination is accomplished by a thin layer of adhesive 14 and 16 applied between each lens element and polarizer film 15. Typically non-prescription lens elements for this type of construction are between 0.8 mm and 1.2 mm in thickness.

In an alternate embodiment of a non-photochromic embodiment of the present invention, front lens element 13 is the multiband contrast enhancer, rear lens element 17 is a grey or color-tinted glass or plastic, and the lamination is accomplished by a thin layer of adhesive 14 and 16 applied between each lens element and polarizer film 15. Typically non-prescription lens elements for this type of construction are between 0.8 mm and 1.2 mm in thickness.

In another alternate embodiment of the present invention, the front surface of the front lens element can have a semi-transparent mirror coating applied. A semi-transparent mirror coating has partly reflective and partly transmissive properties. Such a coating can serve a purely cosmetic function, and it can also provide a light-filtering function as in the case of colored mirror coatings which selectively block the transmittance of certain wavelengths of light by providing high reflectivity for those wavelengths and low reflectivity for other wavelengths. Those portions of the light which are reflected are not transmitted to the eye of the person wearing a lens so coated.

Lenses of the present invention can also be manufactured with photochromic front lens elements. With that structure, rear lens element 17 is the multiband contrast-enhancing element. In such a structure, the photochromic material is selected to have adequate UV or near-UV transmittance in its fully lightened state to allow curing front adhesive layer 14 by introducing the curing light into the front surface of the lens assembly. However, since the chosen photochromic material must adequately block UV light when fully darkened to protect inner layers, the exposure time for the curing of the adhesive is kept short enough so that the photochromic darkening response of the front lens element is negligible over that time period and does not interfere with curing front adhesive layer 14. In such a lens assembly, polarizer film 15 typically has a luminous transmittance of 28 to 32 percent to yield a finished lens with a luminous transmittance of 8 to 10 percent in the fully darkened state and 16 to 22 percent luminous transmittance in the fully lightened state. If a semi-transparent mirror coating is applied to a photochromic embodiment of the present invention, the coating is designed to transmit enough light of the required wavelengths to permit the desired amount of darkening of the photochromic lens element.

The composition of the photochromic lens element is selected to possess desirable low-transmittance properties for UV and near-UV when in the darkened state, and sufficiently high transmittance of the wavelengths chosen for curing front adhesive layer 14 when fully lightened. One example of a suitable photochromic lens element is a 1.0 mm thick lens element made of Schott D-1426 Photosolar Supergrey ophthalmic glass. Visible-curing adhesives for wavelengths in the 380 to 450 nm range may be more suitable for photochromic embodiments of the present invention than those which require wavelengths exclusively below 380 nm. An example of a visible-curing adhesive is Dymax OP-43, available from Dymax Corporation of Torrington, Conn., USA. This particular adhesive also absorbs UV wavelengths after curing, so it contributes to the UV-blocking properties of the finished lens. Rear lens element 17 in this embodiment is the multiband contrast enhancer, and rear adhesive layer 16 is of a type that can be cured by introducing near-UV light of the required wavelengths into the back surface of the lens. These wavelengths are transmitted through lens element 17 with adequate strength to cure visible-cure type adhesive, especially if a high-intensity light source of the required spectral output is used. Alternatively, if sufficient UV light can be transmitted through the photochromic lens element, front adhesive layer, and polarizer film, then UV-curing adhesive could be used for the rear adhesive layer instead of the visible-curing type. This photochromic embodiment is very useful for wearers who encounter a wide range of lighting conditions.

In embodiments of a laminated lens of the present invention which require UV-curing adhesive and wherein the rear lens element is the multiband contrast enhancer and the front lens element is the photochromic lens element, the photochromic lens element provides:

a) less than 20 percent light transmittance at 360 nm when the photochromic lens element is in a fully darkened state;

b) less than 10 percent light transmittance of wavelengths lower than 340 nm regardless of the lightened or darkened state of the photochromic lens element;

c) at least 30 percent light transmittance at 360 nm when the photochromic lens element is in a fully lightened state; and d) luminous transmittance in the range of 45 percent to 55 percent when the photochromic lens element is in a fully darkened state;

when the luminous transmittance is measured in accordance with ANSI specification Z80.3-2001.

Photochromic embodiments of the present invention can also be constructed with a semi-transparent mirror coating applied to the front surface of the lens. The semi-transparent mirror coating is designed to transmit enough light of the appropriate wavelengths to enable darkening of the photochromic lens element when the front surface of the lens is exposed to sunlight.

In various embodiments of the present invention, antireflective coatings are applied to at least one surface of the lens. Antireflective coatings are applied in a vacuum chamber and consist of various chemicals which are vaporized and then deposited onto the surface of the lenses in the chamber. These coatings greatly reduce the light reflected from the surface of the lens and are often present on premium-quality sunglasses to reduce the amount of stray light reflected from the back of the lens and into the eyes of the wearer.

In the preferred embodiments of the present invention which utilize glass lens elements, the multiband contrast enhancer is an ophthalmic-grade glass composition comprising oxides of neodymium, praseodymium, erbium, and vanadium. The amounts and ratios of these oxides can be varied over a finite range to produce a contrast enhancer within the scope of the present invention. The neodymium oxide is used primarily to attenuate a narrow band of wavelengths centered near 585 nm, and to a lesser extent, another narrow band of wavelengths centered near 520 nm. The praseodymium oxide is used to control the transmittance of wavelengths in the range of 420 to 460 nm and to widen the attenuation band centered near 585 nm. The erbium oxide is used to increase the attenuation of the band centered near 520 nm. The vanadium pentoxide is used to absorb UV wavelengths below 360 nm and to attenuate visible violet, violet-blue, and blue wavelengths in the range of 380 nm to 460 nm.

Neodymium oxide has a violet-blue color, praseodymium oxide has a yellow-green color, vanadium pentoxide has a green color, and erbium oxide has a pink color. These are added in a precise ratio to a colorless glass composition to produce a pale grey glass. This produces a multiband contrast-enhancement glass that, with reference to CIE illuminant D65, possesses the desired spectral filter properties, and has a luminous transmittance of approximately 60 percent when ground and polished to 1 mm thickness. Prototype glass samples in conformance to the present invention have been produced by Schott AG of Grunenplan, Germany.

One type of adhesive that can be used in the lens of the present invention is a UV-curing type commonly used in the optical and ophthalmic industries. When the multiband contrast enhancer is the front lens element and the UV light which is used to initiate the curing of this adhesive is introduced from the backside of the lens due to the high degree of UV absorption in the multiband contrast enhancer, the rear lens element must be of a composition that transmits enough UV light to allow for the curing of both layers of adhesive. In this type of construction, the layer of adhesive immediately behind the front lens element can have blocking properties in the near-UV and UV wavelengths in order to augment the absorption already present in the front lens element without compromising the UV-curing of either adhesive layer, since UV light introduced from the back need only penetrate to the front adhesive layer and not beyond. If this method is used, the polarizer and/or the rear adhesive layer must be able to transmit enough UV light to cure the front adhesive layer.

There are also some adhesives which initiate curing upon exposure to either UV or visible wavelengths up to 550 nm. If this type of adhesive is used for both adhesive layers in lenses of the present invention, the curing light can be introduced from either side of the lens or from both sides. Furthermore, if such an adhesive is used, the lens element which is not the multiband contrast enhancer can be formulated to also block UV and near-UV light, thereby providing extremely thorough blocking of these wavelengths in the finished laminated lens assembly.

In another embodiment of the present invention, the multiband contrast enhancer comprises an ophthalmic-grade plastic composition incorporating the oxides of neodymium, praseodymium, erbium, and vanadium in a chemical form suitable for inclusion in plastic. There are several methods currently disclosed for adding such colorants to plastic compositions. These methods include those disclosed in U.S. Pat. Nos. 6,650,473; 6,807,006; and 6,894,182.

Several methods for manufacturing a plastic embodiment of the present invention are available. These include lamination methods similar to those used in the construction of laminated glass lenses, as well as several other methods of injection, casting, and forming well known to the industry and previously disclosed in numerous US and foreign patents.

The essence of the present invention includes the spectral-transmittance properties of the multiband contrast enhancer, the colorant composition of the multiband contrast enhancer, and the combination of the multiband contrast enhancer and a polarizer in a sunglass lens.

The colorant composition of the multiband contrast enhancer of the preferred embodiment of the invention is indicated by the following list:

Neodymium oxide in the range of between 1.25 and 2.5 mole percent;

Praseodymium oxide in the range of between 0.25 and 1.75 mole percent;

Erbium oxide in the range of between 0.5 and 2.0 mole percent; and

Vanadium pentoxide in the range of between 0.5 and 2.0 mole percent A lens having a colorant composition as indicated by this list results in the following spectral-transmittance properties:

a) maximum light transmittance for at least one wavelength within each of two green wavelength ranges, the first green wavelength range being from 490 nanometers (nm) to 510 nm, the second green wavelength range being from 540 nm to 560 nm, wherein the wavelengths of maximum transmittance in each of the green wavelength ranges have a transmittance value which is at least 120 percent of the value of luminous transmittance of the multiband contrast enhancer;

b) maximum light transmittance for at least one wavelength within a red wavelength range of from 620 nm to 720 nm wherein the wavelength of maximum transmittance has a transmittance value which is at least 120 percent of the value of the luminous transmittance of the multiband contrast enhancer;

c) minimum light transmittance for at least one wavelength within each of two wavelength ranges, the first wavelength range being from 515 nm to 525 nm, the second wavelength range being from 570 nm to 590 nm, wherein the wavelengths of minimum transmittance in each of the wavelength ranges have a transmittance value of less than 75 percent of the value of luminous transmittance of the multiband contrast enhancer;

d) light transmittance so that the value of the light transmittance at any wavelength within the range of wavelengths from 420 nm to 460 nm is less than 125 percent of the value of the luminous transmittance of the multiband contrast enhancer;

e) light transmittance so that the value of the light transmittance at 400 nm is between 50 percent and 100 percent of the value of the luminous transmittance of the multiband contrast enhancer;

f) light transmittance so that the value of the light transmittance at any wavelength between 250 nm and 365 nm is less than 1 percent of the value of luminous transmittance of the multiband contrast enhancer; and wherein the luminous transmittance of the multiband contrast enhancer is measured in accordance with ANSI Z80.3-2001.

Depending upon exact formulation, a multiband contrast enhancer of the present invention also provides the following light transmittance values: light transmittance with a value at 425 nm that is in the range of from 80 percent to 120 percent of the value of the light transmittance at 460 nm; light transmittance with a value at 425 nm that is equal to 95 percent to 105 percent of the value of the luminous transmittance of the multiband contrast enhancer; and light transmittance with a value at 425 nm that is less than the value of the luminous transmittance of the multiband contrast enhancer.

These values are based on the luminous transmittance of the multiband contrast enhancer being measured in accordance with ANSI specification Z80.3-2001. For the preferred embodiment of the invention comprising 1 mm thick lens elements, the luminous transmittance of the multiband contrast enhancer has a value in the range of between 55 percent and 65 percent.

These spectral-transmittance properties of the present invention are shown compared to the patents of the prior art in the graphs of FIGS. 2A-2D.

Figure 2A:
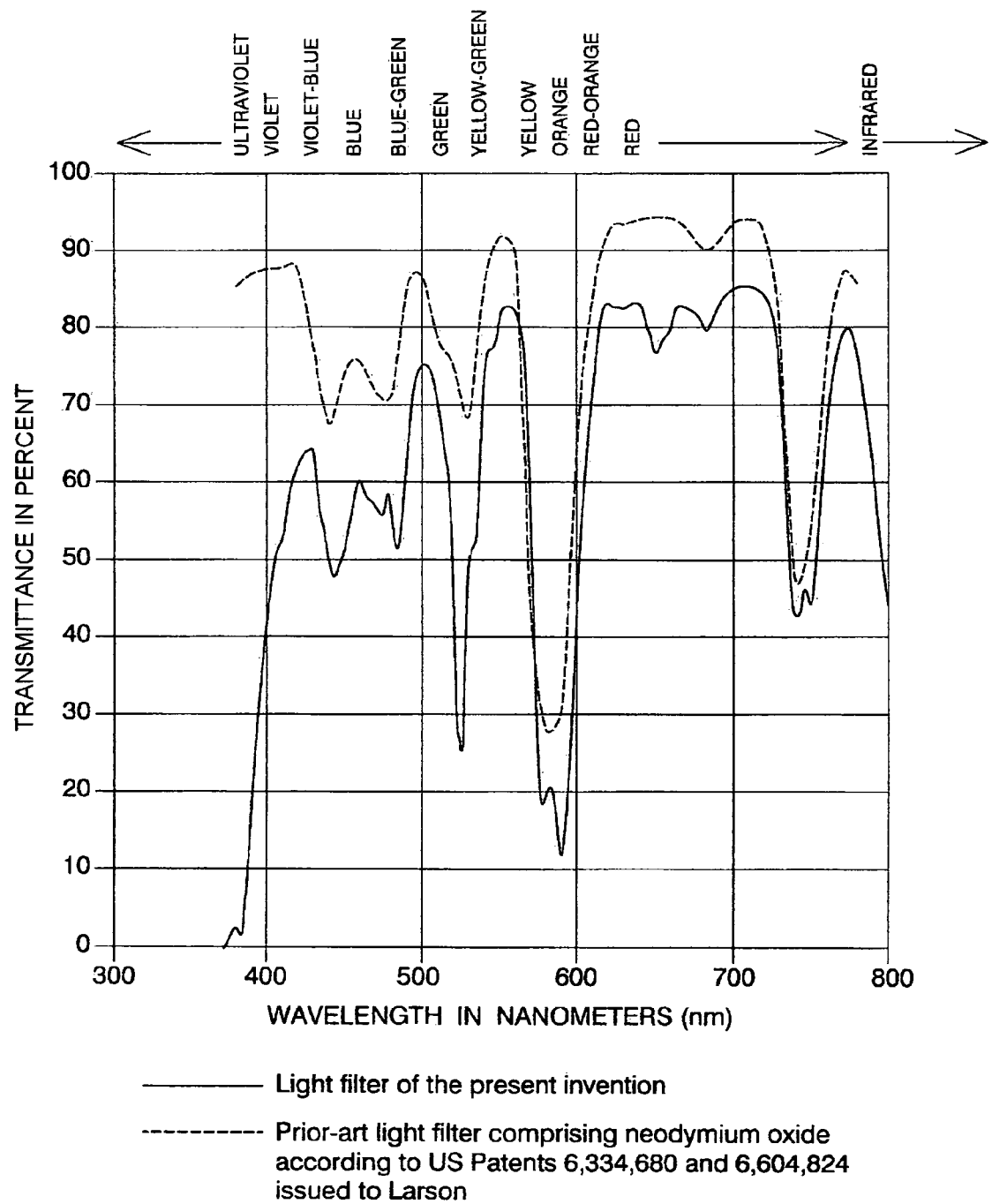
FIG. 2A is a graph comparing the spectral-transmittance properties of the multiband contrast enhancer of the present invention to the spectral-transmittance properties of the light filter comprising neodymium oxide as disclosed in U.S. Pat. No. 6,604,824 and U.S. Pat. No. 6,334,680 issued to Larson.

FIG. 2A is a comparison of the spectral-transmittance properties of two different types of light filtering glass. The solid line represents a 1 mm thick lens made from light-filtering glass according to the present invention, while the dashed line represents a 1 mm thick lens made of glass doped with neodymium oxide according to the Larson patents. Note the difference in transmittance around 400 nm and the difference in the depth of the absorption band around 525 nm. No adjustment of the amount of neodymium oxide as disclosed by Larson would produce the same transmittance properties as the present invention.

FIG. 2B compares the spectral-transmittance properties of a 1 mm thick lens made from light-filtering glass according to the present invention with the 1.5 mm thick light-filtering glass depicted by Tsutsumi in FIG. 5 of U.S. Pat. No. 6,773,816. Changing the thickness of the Tsutsumi glass to 1 mm would also not produce the spectral-transmittance properties of the present invention. No adjustment to this Tsutsumi glass within the disclosure of U.S. Pat. No. 6,773,816 would produce the spectral-transmittance properties of the present invention.

Figure 2C:
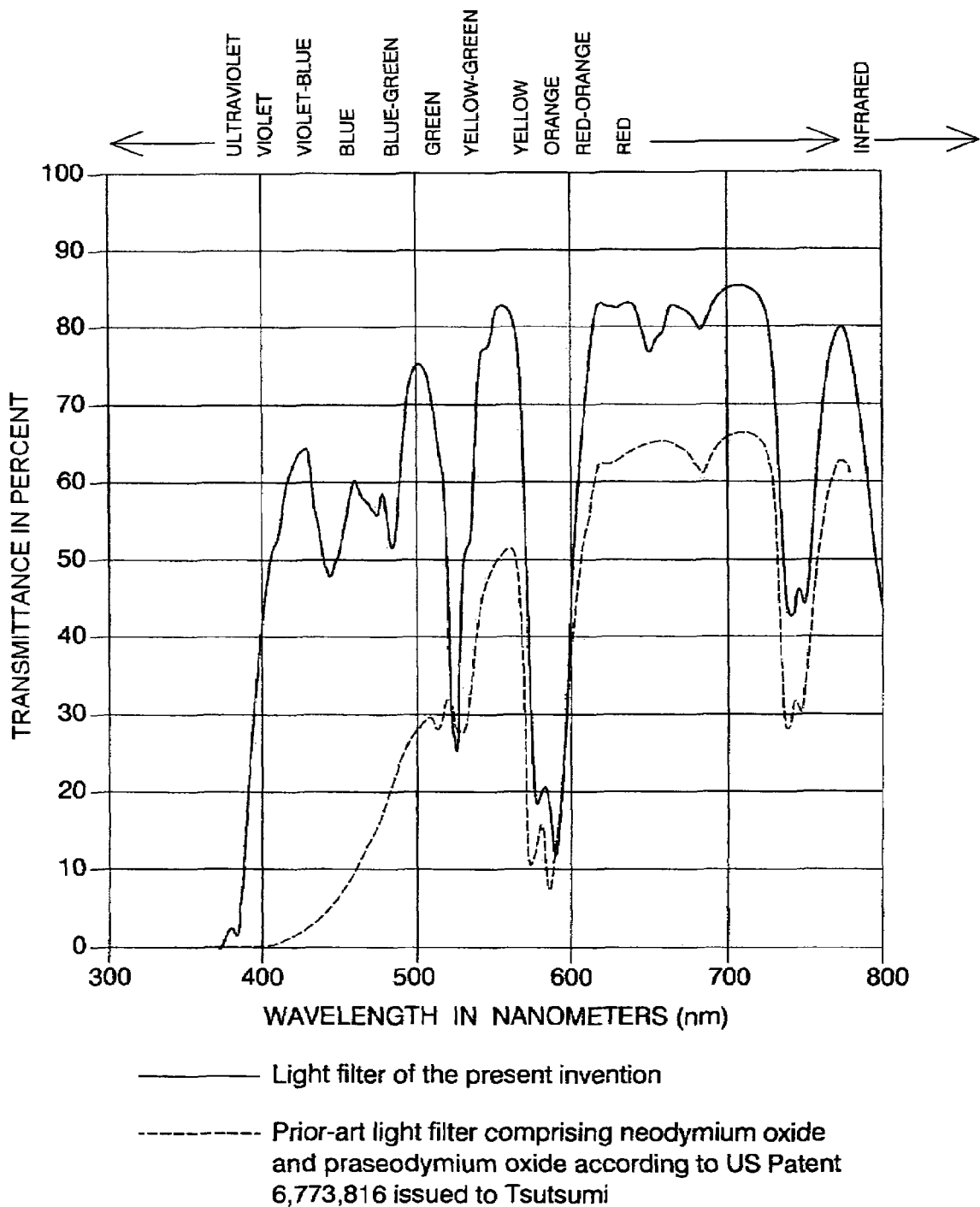
FIG. 2C is a graph comparing the spectral-transmittance properties of the multiband contrast enhancer of the present invention to the spectral-transmittance properties of a second light filter comprising neodymium oxide and praseodymium oxide as disclosed in U.S. Pat. No. 6,773,816 issued to Tsutsumi.

FIG. 2C compares the spectral-transmittance properties of a 1 mm thick lens made from light-filtering glass according to the present invention with the 2.2 mm thick light-filtering glass depicted by Tsutsumi in FIG. 7 of U.S. Pat. No. 6,773,816. Changing the thickness of the Tsutsumi glass to 1 mm would not produce the spectral-transmittance properties of the present invention, and no adjustment to the Tsutsumi glass within the disclosure of U.S. Pat. No. 6,773,816 would produce the spectral-transmittance properties of the present invention.

Figure 2D:
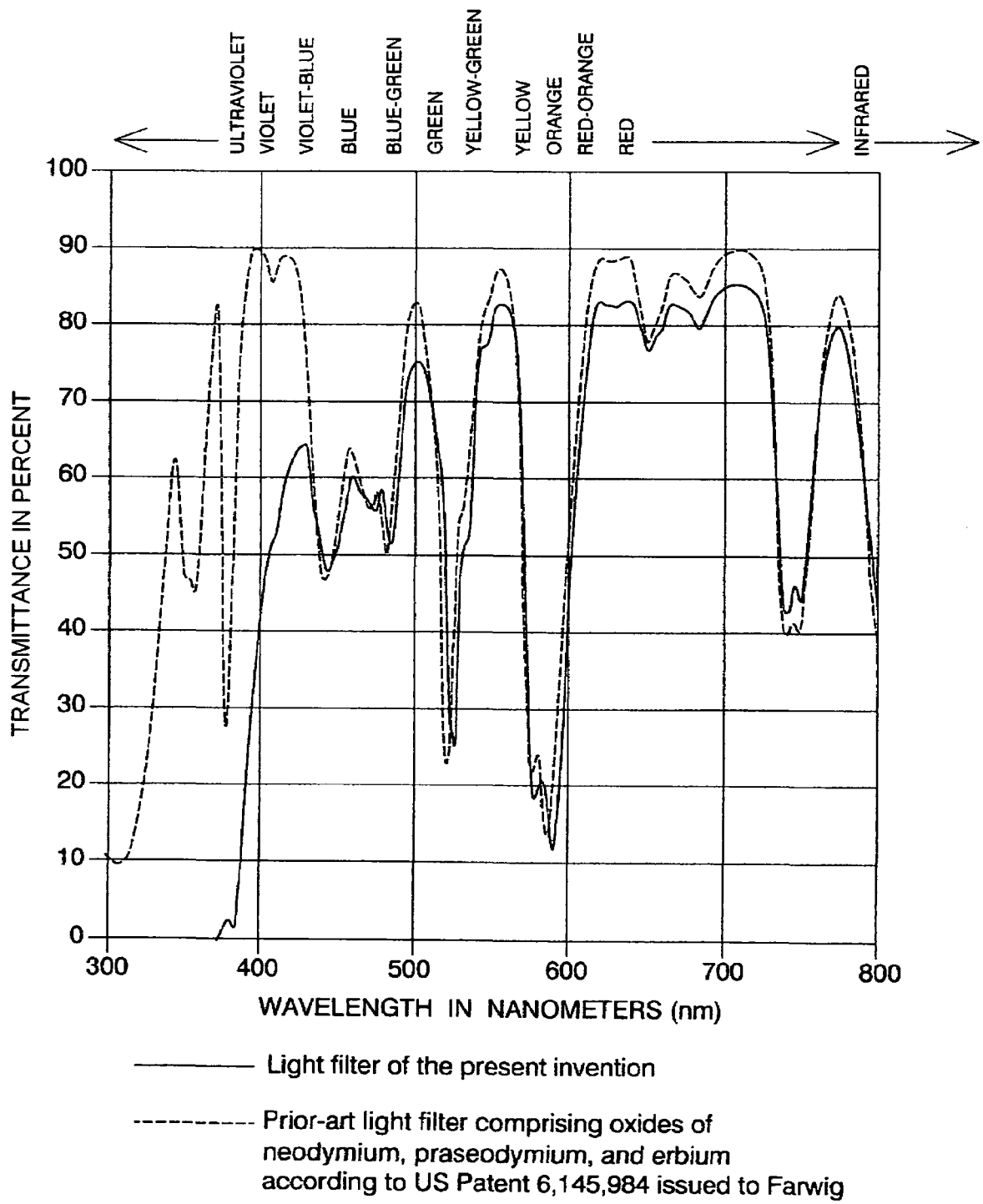
FIG. 2D is a graph comparing the spectral-transmittance properties of the multiband contrast enhancer of the present invention to the spectral-transmittance properties of a light filter comprising neodymium oxide, praseodymium oxide, and erbium oxide as disclosed in U.S. Pat. No. 6,145,984 issued to Farwig.

FIG. 2D compares the spectral-transmittance properties of a 1 mm thick lens made from light-filtering glass according to the present invention with a 1 mm thick lens made from a glass disclosed in U.S. Pat. No. 6,145,984 issued to Farwig. No adjustment to the glass disclosed in U.S. Pat. No. 6,145,984 would produce the spectral-transmittance properties of the lens disclosed in the present invention.

It is to be understood that the forms of this invention as shown herein are merely preferred and alternate embodiments. Various changes may be made in the function and arrangement of parts; equivalent means may be substituted for those illustrated and described; and certain features may be used independently from others without departing from the spirit and scope of the invention as defined in the following claims.

What is claimed is:

1. A sunglass lens comprising a multiband contrast enhancer means and a light polarizer, the multiband contrast enhancer means providing:
   a) maximum light transmittance for at least one wavelength within each of two green wavelength ranges, the first green wavelength range being from 490 nanometers (nm) to 510 nm, the second green wavelength range being from 540 nm to 560 nm, wherein the wavelengths of maximum transmittance in each of the green wavelength ranges have a transmittance value which is at least 120 percent of the value of luminous transmittance of the multiband contrast enhancer;
   b) maximum light transmittance for at least one wavelength within a red wavelength range of from 620 nm to 720 nm wherein the wavelength of maximum transmittance has a transmittance value which is at least 120 percent of the value of the luminous transmittance of the multiband contrast enhancer;
   c) minimum light transmittance for at least one wavelength within each of two wavelength ranges, the first wavelength range being from 515 nm to 525 nm, the second wavelength range being from 570 nm to 590 nm, wherein the wavelengths of minimum transmittance in each of the wavelength ranges have a transmittance value less than 75 percent of the value of luminous transmittance of the multiband contrast enhancer;
   d) light transmittance so that the value of the light transmittance at any wavelength within the range of wavelengths from 420 nm to 460 nm is less than 125 percent of the value of the luminous transmittance of the multiband contrast enhancer;
   e) light transmittance so that the value of the light transmittance at 400 nm is between 50 percent and 100 percent of the value of the luminous transmittance of the multiband contrast enhancer;
   f) light transmittance so that the value of the light transmittance at any wavelength between 250 nm and 365 nm is less than 1 percent of the value of luminous transmittance of the multiband contrast enhancer; and
   g) wherein the light transmittance and luminous transmittance values of the multiband contrast enhancer are measured using CIE illuminant D65 in accordance with ANSI specification Z80.3-2001.

2. The sunglass lens of claim 1 wherein said lens comprises two optical lens elements adhered together with the light polarizer encapsulated between the two lens elements.

3. The sunglass lens of claim 2 wherein the front lens element is the multiband contrast enhancer.

4. The sunglass lens of claim 1 wherein the multiband contrast enhancer comprises neodymium oxide in the range of 1.25 mole percent to 2.5 mole percent, praseodymium oxide in the range of 0.25 mole percent to 1.75 mole percent, erbium oxide in the range of 0.5 mole percent to 2.0 mole percent, and vanadium pentoxide in the range of 0.5 mole percent to 2.0 mole percent.

5. The sunglass lens of claim 1 wherein the multiband contrast enhancer provides light transmittance with a value at 425 nm that is in the range of 80 percent to 120 percent of the value of the light transmittance at 460 nm.

6. The sunglass lens of claim 1 wherein the multiband contrast enhancer provides light transmittance at 425 nm that is in the range of 95 percent to 105 percent of the value of the luminous transmittance of the multiband contrast enhancer.

7. The sunglass lens of claim 1 wherein the multiband contrast enhancer provides light transmittance at 425 nm that is less than the value of the luminous transmittance of the multiband contrast enhancer.

8. The sunglass lens of claim 1 wherein an antireflective coating is applied to at least the back surface of the lens.

9. The sunglass lens of claim 1 wherein a semi-transparent mirror coating is applied to the front surface of the lens.

10. The sunglass lens of claim 2 wherein the rear lens element is the multiband contrast enhancer and the front lens element is a photochromic lens element.

11. The sunglass lens of claim 10 wherein the photochromic lens element provides:
    a) less than 20 percent light transmittance at 360 nm when the photochromic lens element is in a fully darkened state;
    b) less than 10 percent light transmittance of wavelengths lower than 340 nm regardless of the lightened or darkened state of the photochromic lens element;
    c) at least 30 percent light transmittance at 360 nm when the photochromic lens element is in a fully lightened state; and
    d) luminous transmittance in the range of 45 percent to 55 percent when the photochromic lens element is in a fully darkened state and the luminous transmittance is measured in accordance with ANSI specification Z80.32001.

12. The sunglass lens of claim 10 wherein an antireflective coating is applied to at least the back surface of the lens.

13. The sunglass lens of claim 10 wherein a semi-transparent mirror coating is applied to the photochromic lens element and the semi-transparent mirror coating transmits enough light to enable darkening of the photochromic lens element when the front surface of the lens is exposed to direct sunlight.

14. The sunglass lens of claim 1 wherein said lens comprises a plastic composition with the light polarizer encapsulated within the lens and wherein the plastic composition comprises the multiband contrast enhancer.

15. The sunglass lens of claim 14 wherein an antireflective coating is applied to at least the back surface of the lens.

16. The sunglass lens of claim 14 wherein a semi-transparent mirror coating is applied to the front surface of the lens.

17. A multiband contrast enhancer means suitable for use in ophthalmic applications comprising neodymium oxide in the range of 1.25 mole percent to 2.5 mole percent, praseodymium oxide in the range of 0.25 mole percent to 1.75 mole percent, erbium oxide in the range of 0.5 mole percent to 2.0 mole percent, and vanadium pentoxide in the range of 0.5 mole percent to 2.0 mole percent, said multiband contrast enhancer means providing:
    a) maximum light transmittance for at least one wavelength within each of two green wavelength ranges, the first green wavelength range being from 490 nanometers (nm) to 510 nm, the second green wavelength range being from 540 nm to 560 nm, wherein the wavelengths of maximum transmittance in each of the green wavelength ranges have a transmittance value which is at least 120 percent of the value of luminous transmittance of the multiband contrast enhancer;
    b) maximum light transmittance for at least one wavelength within a red wavelength range of from 620 nm to 720 nm wherein the wavelength of maximum transmittance has a transmittance value which is at least 120 percent of the value of the luminous transmittance of the multiband contrast enhancer;

c) minimum light transmittance for at least one wavelength within each of two wavelength ranges, the first wavelength range being from 515 nm to 525 nm, the second wavelength range being from 570 nm to 590 nm, wherein the wavelengths of minimum transmittance in each of the wavelength ranges have a transmittance value less than 75 percent of the value of luminous transmittance of the multiband contrast enhancer;

d) light transmittance so that the value of the light transmittance at any wavelength within the range of wavelengths from 420 nm to 460 nm is less than 125 percent of the value of the luminous transmittance of the multiband contrast enhancer;

e) light transmittance so that the value of the light transmittance at 400 nm is between 50 percent and 100 percent of the value of the luminous transmittance of the multiband contrast enhancer;

f) light transmittance so that the value of the light transmittance at any wavelength between 250 nm and 365 nm is less than 1 percent of the value of luminous transmittance of the multiband contrast enhancer; and g) wherein the light transmittance and luminous transmittance values of the multiband contrast enhancer are measured using CIE illuminant D65 in accordance with ANSI specification Z80.32001.

* * * * *